Oct. 17, 1961   W. J. OPOCENSKY ET AL   3,004,441
INTEGRATOR BALL CARRIAGE ADJUSTMENT
Filed Jan. 15, 1959                    2 Sheets-Sheet 1
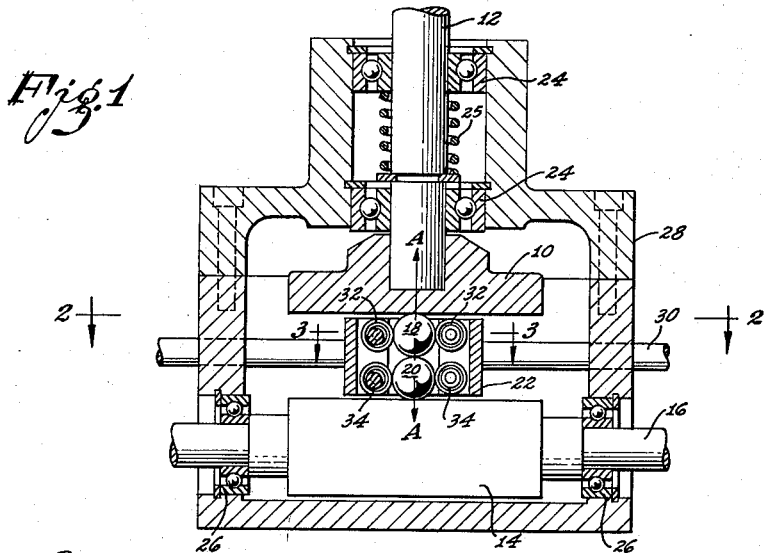
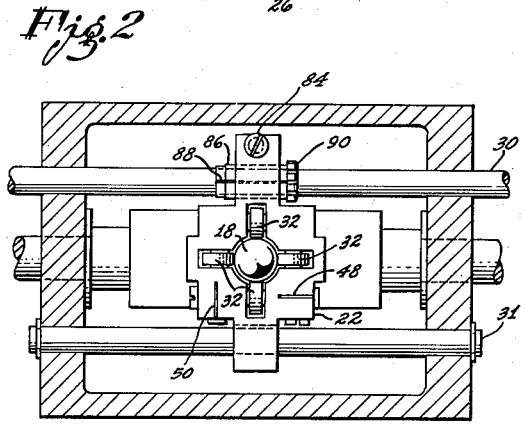
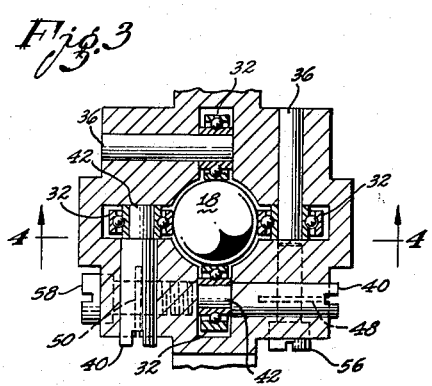
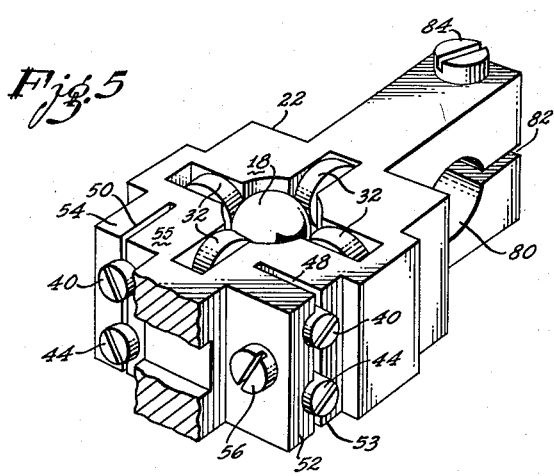
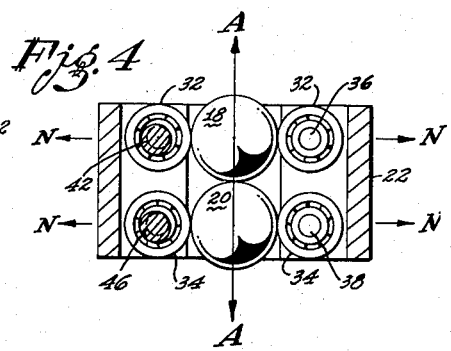
INVENTORS:
Willard J. Opocensky
George W. Seevers
BY
*Attorneys*

Oct. 17, 1961 W. J. OPOCENSKY ET AL 3,004,441
INTEGRATOR BALL CARRIAGE ADJUSTMENT
Filed Jan. 15, 1959 2 Sheets-Sheet 2

INVENTORS:
Willard J. Opocensky
George W. Seevers
BY
Geo Seevers
Attorney.

United States Patent Office 3,004,441
Patented Oct. 17, 1961

3,004,441
INTEGRATOR BALL CARRIAGE ADJUSTMENT
Willard J. Opocensky and George W. Seevers, Glendale, Calif., assignors to General Precision, Inc., a corporation of Delaware
Filed Jan. 15, 1959, Ser. No. 786,931
7 Claims. (Cl. 74—198)

This invention relates to a new and improved variable speed mechanism and more particularly to an improved ball carriage for a variable speed transmission especially adaptable for a computing integrator.

Variable speed transmissions and particularly computing integrators are well known in the art. Specific showing of such integrators is described in Patent Number 2,602,338 to Opocensky and Imm, wherein the ball carriage is of the type that is provided with a friction sleeve to support the transmission balls. For a better understanding of the problem involved, attention is directed to Patent Number 2,687,043 to Umstead which describes a support for the transmission balls consisting of roller bearings.

Heretofore two major problems in integrators have been backlash and drag or load on the sleeve type ball carriage. As the balls and their support become worn, the balls become tilted or canted from the vertical axis, to which they were originally constrained, causing an unacceptable backlash at all ranges of the integrand input, but greatest at the lower ranges. In addition, a wedging action tends to develop which increases the sliding friction on the balls and thus requires more load or weight to move the ball carriage. This condition is further accented when wear occurs on the ball support by virtue of the fact that dirt and foreign matter is permitted to come between the balls and the support thereby further increasing this friction. The second problem which is possibly even more objectionable than the first is inherent in ball carriages for integrators and that is the normal loading or friction drag between the balls and the sleeve, when a sleeve support is used which must of necessity be built into the carriage and results in a "jitter" on the ball carriage.

Heretofore attempts have been made to overcome both of these objections by the use of ball or roller bearings as a replacement for the friction sleeve. Until the present invention, this has proven impractical or impossible because of the inability to adjust the bearing support to properly align the balls and at the same time set the adjustment between the balls and the support to a sufficiently close tolerance so as to eliminate backlash. Failure to be able to provide for this adjustment has brought about attempts to build the required accuracy into the integrator, but these attempts have all proven impractical, if not actually impossible, and insofar as is known by applicant have been abandoned because of cost, rejects, etc.

A further objection to prior art integrator ball carriages arises out of a combination of the two above-mentioned difficulties. Ordinarily when the ball carriage is set for a "zero" readout, the center of the ball in contact with the input disk is on the center of the input disk and the integrator should be reading a "zero" output, but the ball in contact with the input member will actually "follow" or rotate with the input disk, from friction alone, and will rotate about an axis coincident and parallel to the axis of the input disk. If the ball support member in the ball carriage, whether it be a friction sleeve or roller bearing is not perfectly aligned or if worn, the axis of the two balls cannot be constrained coincident to the vertical axis through the input disk. When such takes place, the ball in contact with the output member will be caused to roll in an arc displaced from the center of the input ball and simultaneously from the vertical axis of the input disk. As motion or roll is transmitted to the output ball from the input ball as the input ball rotates with the input disk about an axis coincident and parallel to that of the input disk, this roll or travel is imparted to the output ball and will cause this ball to turn or roll and a false reading is thus imparted to the output member.

It is the object of this invention to overcome these objections by providing an adjustment for either or both of the transmission balls which is sufficiently accurate and sensitive so as to permit elimination of backlash and at the same time permit a sufficient loading on at least one of the balls, preferably the input ball, to overcome the false rotation of the output ball while at the same time reduce the loading or drag imparted to the ball carriage by the friction of the support for the balls to an absolute minimum.

Briefly described, this improved integrator comprises a carriage for conventional balls adjustable between an input disk and an output member. Instead of the conventional sleeve, each ball is supported by means of one set of circumferentially disposed roller bearings disposed around each ball in a plane parallel, or substantially parallel, to the surface of the input disk. At least one of the roller bearings in each set is mounted on a rotatable pin set in the case or housing of the ball carriage which is provided with a cam thereon that supports the inner race of the roller bearing. When the rotatable pin with its cam is turned, the cam will move the roller bearing toward or away from the ball thus permitting individual adjustment and loading on the ball. Suitable locking means for the prevention of undesired rotation of the pin is provided together with means for aligning the travel of the input ball through the center of the input disk.

Other objects and advantages of this invention will become apparent as the discussion proceeds and when taken in connection with the accompanying claims and drawings in which:

FIGURE 1 is a side view of an integrator embodying the present invention with certain elements of the mechanism shown in full section for clarity;

FIGURE 2 is a plan view partially in section taken along the line 2—2 of FIGURE 1;

FIGURE 3 is a sectional view taken along the line 3—3 of FIGURE 1;

FIGURE 4 is a sectional view taken along the line 4—4 of FIGURE 3;

FIGURE 5 is a perspective view showing the ball carriage adjustment and locking means in enlarged assembled detail;

Figure 6:
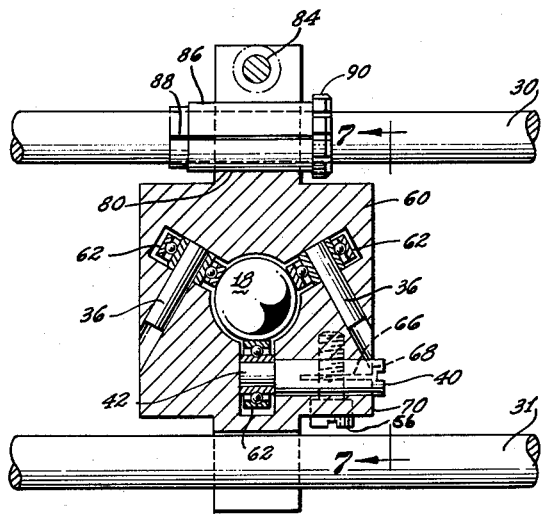
FIGURE 6 is a modified view embodying this invention showing three support rollers instead of four.

Referring now to the accompanying drawings, the illustrated embodiment of the present invention comprises a rotatable disk 10 secured to an input shaft 12, a rotatable cylinder 14 carried by an output shaft 16 and disposed on an axis parallel to the surface of the disk 10, and a pair of contacting balls designated, respectively, 18 and 20. The contacting ball 18 is in surface contact with the input disk 10 and contacting ball 20 is in surface contact with the rotatable cylinder 14. The balls 18 and 20 are adjustable along a path diametrical of disk 10 and paralleling the axis of cylinder 14 by means of a ball carriage 22. Suitable bearings 24 support the input shaft 12 and another pair of suitable bearings 26 support the output shaft 16 in housing 28. Spring 25 provides loading tension on input disk 10. A pull rod 30 is slidably mounted in housing 28 and is connected to the ball carriage 22 for the purpose of adjusting the ball carriage radially along the disk 10 and the cylinder 14. A guide rod 31 is supported at each end in the housing 28, as shown in FIGURE 2. All of the foregoing is explained in detail in U.S. Patent Number 2,602,338 to Opocensky and Imm. Inasmuch as a thorough understanding of this portion of the integrator is well known in the prior art and is described in detail in the aforementioned U.S. patent, it is deemed unnecessary to describe the structure and operation of this integrator in further detail here.

In place of a conventional sleeve supporting the balls 18 and 20, an upper set of four roller bearings designated generally by the numerals 32 are provided as shown in all of the figures. A like set of four roller bearings 34 support the ball 20 in a manner similar to the bearings 32. At least two of the bearings 32 are supported on conventional pins 36, as are at least two of bearings 34 supported on pins 38. However, the other two bearings 32 are supported by means of a rotatable pin 40 having a cam, or eccentric, 42 on the end thereof. The inner race of bearings 32 is mounted upon cam 42.

As pin 40 is turned, the cam 42 on the end thereof urges ball 18 against or away from the opposite or complementary bearings 32 thereby enabling adjustment of each pair of bearings in the set for the purpose of quickly and accurately aligning and properly loading ball 18. A second pair of rotatable pins 44 having cams 46 thereon similar to pins 40 and cams 42 are provided for two of the roller bearings 34 supporting ball 20 and function identical to the pins 40 and cams 42. The ball carriage 22 is provided with a slot 48 extending parallel to a first set of pins 40 and 44 and another slot 50 extending parallel to a second set of pins 40 and 44, as best shown in FIGURES 2 and 5. The slot 48 forms a pair of jaws designated generally by the numerals 52 and 53 which embrace one set of pins 40 and 44, and the second slot 50 forms another set of jaws 54 and 55 which embrace the second set of rotatable pins 40 and 44. A screw 56 extending through jaws 52 and 53 serves to clamp jaw 52 against jaw 53, thereby rigidly locking the first set of pins 40 and 44 against rotation after one bearing of set 32 and one bearing of set 34 have been adjusted to the desired loading. A second screw 58 clamps jaws 54 and 55 together against the second set of pins 40 and 44 for the same purpose.

As illustrated in FIGURE 5 ball carriage 22 is provided with a hole 80, a slot 82, and a set screw 84 so that it may be clamped to slide rod 30. In order to provide an adjustment to ball carriage 22 in a direction normal to the axis of slide rod 30 so that the ball 18 may be precisely positioned to pass through the center of disk 10, an eccentric sleeve 86 is fitted around slide rod 30 and into hole 80 in ball carriage 82. Eccentric sleeve 86 is provided with a longitudinal slot 88 so that a tightening of screw 84 will cause sleeve 86 to clamp around slide rod 30, and may be provided with a knurled head 90 so that it may be rotated to obtain the proper transverse adjustment of the ball carriage 22. This adjustment permits perfect alignment of the balls 18 and 20 so that after assembly the ball carriage 22 can be adjusted so as to bring the center of the vertical axis of ball 18 precisely coincident with the center of disk 10 at the "zero" readout position of the ball carriage.

Figure 7:
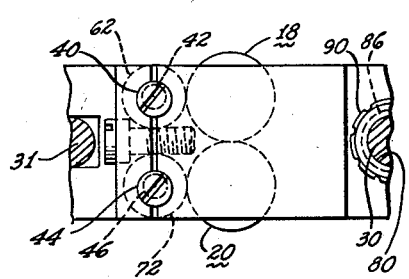
FIGURE 7 is an end view taken along the line 7—7 of FIGURE 6.

Turning now to a detailed description of the modification of this invention shown in FIGURES 6 and 7, the numeral 60 designates a ball carriage substantially the same as ball carriage 22. At 62 there is shown a set of three roller bearings identical with the roller bearings 32 which support ball 18. Two of the bearings 62 are supported on pins 36 the same as the pins 36 shown in FIGURE 3 and a third bearing of the set of bearings 62, as shown in FIGURE 6, is supported by a pin 40 having a cam 42 provided thereon. The pin 40 and cam 42 is identical with the pin 40 and cam 42 shown in FIGURE 3. A second set of bearings 72 identical with bearings 62 support ball 20 and are mounted on pins 44 having cams 46 in the same manner as are bearings 62. A single slot 66 is provided in the ball carriage which forms a pair of jaws 68 and 70 comparable to jaws 52 and 53 shown in FIGURE 5. A set screw 56 clamps the jaws 68 and 70 around pins 40 in the same manner as do the jaws 52 and 53 illustrated in FIGURE 5. The bearing support 72 for ball 20 is mounted and functions in the same manner as the bearings 62 for ball 18.

Turning now to a detailed explanation of the operation of this invention, attention is first invited to the arrow in FIGURE 4 and FIGURE 1 designated by the letters A—A and to the second arrows designated by the letters N—N. The arrow A—A represents the axis of rotation of balls 18 and 20 on a line at right angles to the surface of the input disk 10. The two arrows N—N represent an axis of rotation of the balls 18 and 20 on a line parallel to the surface of the input disk 10.

As has been mentioned earlier, the desired optimum adjustment and operation of an integrator ball carriage is to have the balls 18 and 20 aligned with their vertical axis of rotation on line A—A which, as the ball carriage is moved across input disk 10, passes exactly through the center of said disk. In order to accomplish this perfect alignment, the pins 40 and 44 are adjusted very finely against balls 18 and 20 until the desired loading on each of the balls is obtained against the complementary bearing located 180° around the ball. This adjustment brings the balls 18 and 20 into proper vertical alignment. In order to minimize metal deformation in jaws 52, 53, 54 and 55 that could destroy accurate adjustment of bearings 32 and 34, it may be desirable to forcibly adjust pins 40 and 44 after clamping screws 56 and 58 are tightened to their normally stressed condition.

Next, in order to put a loading on either or both of the balls so that a drag is provided when the balls attempt to rotate around vertical axis A—A; i.e., when the input ball 18 is on dead center of the input disk 10, the loading on bearings 32 or on bearings 34 must be sufficiently heavy so as to overcome the rotational friction between input disk 10 and input ball 18. It can be seen from the foregoing that this loading of the bearings 32 and or the bearings 34 completely eliminates a false readout on cylinder 14 when the ball carriage is set on "zero" readout. The vernier adjustment of pins 40 and 44 together with cams 42 and 46 also permits such a fine adjustment of the setting or loading on balls 18 and 20 that backlash is completely or substantially eliminated, while at the same time the rolling action of roller bearings 32 permit a minimum of drag on the ball carriage. In order to further lessen the drag on the ball carriage 22, the placement of the right and left bearings 32 as shown in FIGS. 2 and 3 and the companion right and left lower bearings 34 may be canted approximately 5 degrees about the A—A axis. This canting of these particular bearings will reduce wear on the balls 18 and 20 caused by pivot friction between the balls 18 and 20 and the right and left bearings 32 and 34. When balls 18 and 20 are being driven by disk 10, the balls, which would normally pivot on the right and left bearings 32 and 34 will now produce a relatively slow rotation of the right and left bearings 32 and 34 thereby permitting lubricant in the integrator to further reduce friction between the balls 18 and 20 and the bearings 32 and 34. Of course, this canting is unnecessary in the modification shown in FIG. 6 because bearings 62 and 72 are positioned so that there could be no pivot friction between these bearings and balls 18 and 20.

It is to be understood that modifications in shape, size and materials can be resorted to in practicing this invention without departing from the spirit thereof as set forth in the following claims.

We claim:

1. A computing integrator comprising a rotatable input disk and an output member, a ball carriage disposed between said disk and said output member and radially adjustable of said disk, said carriage having two slots therein, each of said slots forming a pair of jaws, a pair of balls within said carriage respectively in driving engagement with said disk, said output member and each other, a pair of pins extending through each of said slots and embraced by said jaws, a cam on the end of each of said pins, a plurality of rolling supports mounted in said carriage radially disposed around each of said balls, two of said rolling supports surrounding each ball being mounted on two of said cams, and locking means extending through each pair of jaws adapted to lock the pins embraced by said jaws against rotation.

2. A computing integrator comprising a rotatable input disk and an output member, a ball carriage disposed between said disk and said output member and radially adjustable of said disk, a housing, a slidable rod in said housing, a rotatable eccentric sleeve in said carriage and surrounding said slidable rod in a manner to provide lateral adjustment to the path of travel of said carriage in respect to the center of said disk, said carriage having two slots therein, each of said slots forming a pair of jaws, a pair of balls within said carriage respectively in driving engagement with said disk, said output member and each other, a pair of pins extending through each of said slots and embraced by said jaws, a cam on the end of each of said pins, a plurality of rolling supports mounted in said carriage radially disposed around each of said balls, two of said rolling supports surrounding each ball being mounted on two of said cams, and locking means extending through each pair of jaws adapted to lock the pins embraced by said jaws against rotation.

3. A computing integrator comprising a rotatable input disk and an output member, a ball carriage disposed between said disk and said output member and radially adjustable of said disk, a housing, a slidable rod in said housing, a rotatable eccentric sleeve in said carriage and surrounding said slidable rod in a manner to provide adjustment of the path of travel of said carriage in respect to the center of said disk, a pair of balls within said carriage, respectively in driving engagement with said disk, said output member and each other, a set of three rolling support members mounted in said carriage radially disposed around each of said balls and in contact therewith, said rolling supports being spaced approximately 120 degrees apart, and rotatable load adjustment pins each having an eccentric end portion which supports one of said rolling support members in each set for varying the loading on the ball surrounded by said supports.

4. A computing integrator comprising a rotatable input disk, an output member, a ball carriage disposed between said disk and said output member and radially adjustable with respect to said disk, a pair of balls mounted within said carriage and respectively positioned in driving engagement with said disk and with said output member and with each other, at least one load adjustment pin rotatably mounted in said carriage and having an eccentric end portion, a plurality of rolling support members mounted in said carriage radially disposed about each of said balls and in contact therewith, and at least one of said rolling support members being mounted on said eccentric end portion of said adjustment pin so that the loading on said ball can be individually adjusted by rotation of said pin.

5. A computing integrator comprising a rotatable disk, an output member, a ball carriage disposed between said disk and said output member and radially adjustable with respect to said disk, a pair of balls mounted in said carriage and respectively positioned in driving engagement with said disk and with said output member and with each other, a pair of sets of three rolling support members mounted in said carriage radially disposed around respective ones of said balls and positioned in contact therewith, said rolling support members in each of said sets being spaced approximately 120 degrees apart, and a pair of load adjustment pins rotatably mounted in said carriage each of said pins having an eccentric end portion for supporting one of said rolling support members in each of said sets independently to vary the loading on individuals ones of said balls.

6. A computing integrator comprising a rotatable input disk, a rotatable output cylinder, a ball carriage disposed between said input disk and said output cylinder, a pair of balls mounted within said ball carriage and positioned to form driving contact with said input disk and with output cylinder and with each other, two sets of four rolling bearings mounted in said carriage, each of said sets being radially disposed about the corresponding ball to provide support for said ball, four adjustment pins rotatably mounted in said carriage and respectively having eccentric end portions, two of said four rolling bearings of each of said sets being disposed on respective ones of said eccentric end portions so that loading on said balls can be individually adjusted by rotation of said pins, and locking means associated with said pins to restrict rotation thereof when said pins are adjusted to a position to provide the proper loading of said roller bearing against said balls.

7. A computing integrator comprising a housing, a rotatable input shaft extending through said housing, an input disk mounted on said input shaft, a rotatable output shaft extending through said housing, an output cylinder mounted on said output shaft, a slidable input rod extending through said housing and parallel to said output shaft, a ball carriage disposed between said disk and said output cylinder, a rotatable eccentric sleeve mounted in said ball carriage and surrounding said slidable input rod to provide adjustment of said ball carriage in a direction perpendicular to said slidable input rod, locking means mounted in said ball carriage to restrict the rotation of said eccentric sleeve when said sleeve is adjusted to a particular position, a pair of balls within said ball carriage to form driving engagement with said input disk and with said output cylinder and with each other, a plurality of rolling support members mounted on said ball carriage radially disposed around each of said balls, a plurality of pins rotatably mounted in said carriage and respectively having eccentric end portions upon which corresponding ones of said plurality of rolling support members are mounted to provide independent load adjustment of said rolling support members against their respective balls, and locking means mounted on said carriage to restrict the rotation of said rotatable pins when said pins are adjusted to provide a particular loading of said rolling support members against said balls.

References Cited in the file of this patent

UNITED STATES PATENTS

| | | |
|---|---|---|
| 2,602,338 | Opocensky et al. | July 8, 1952 |
| 2,687,043 | Umsted | Aug. 24, 1954 |
| 2,783,653 | Brown | Mar. 5, 1957 |
| 2,881,623 | Eldridge | Apr. 14, 1959 |